Oct. 2, 1962        J. M. DALE        3,056,613
QUICK-BREAK MARITIME COUPLING
Filed Feb. 18, 1960        3 Sheets-Sheet 1
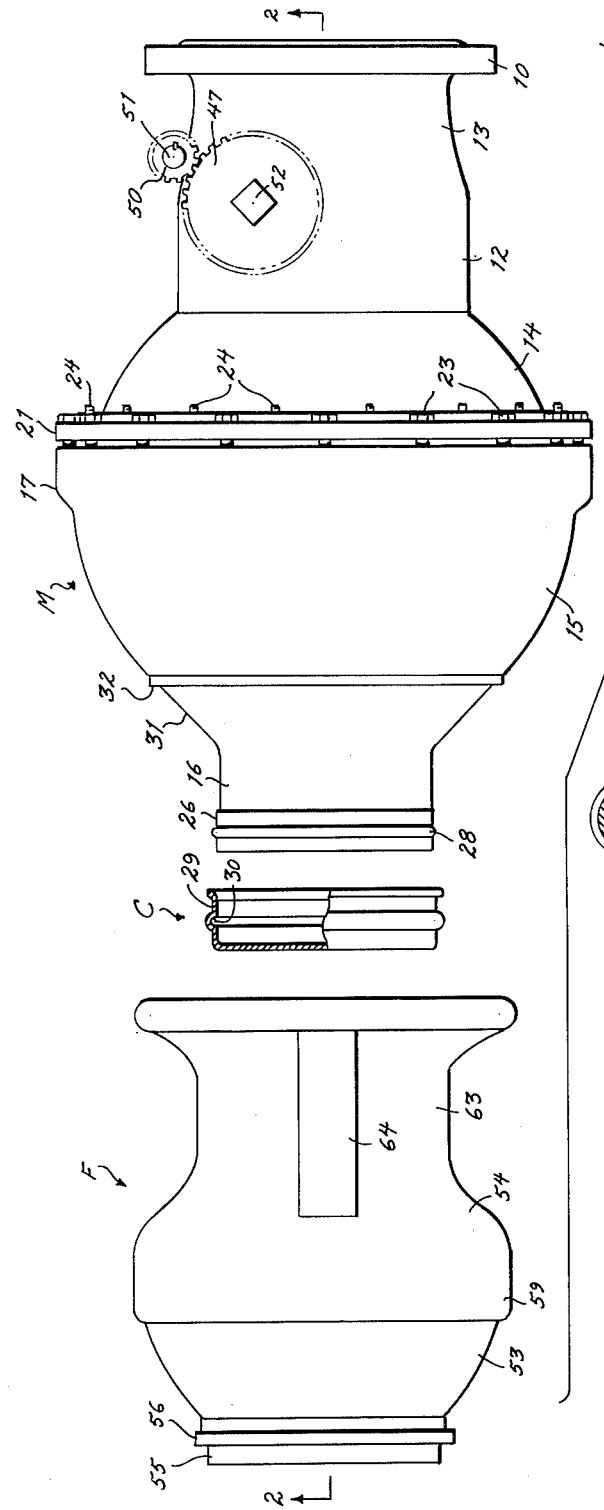
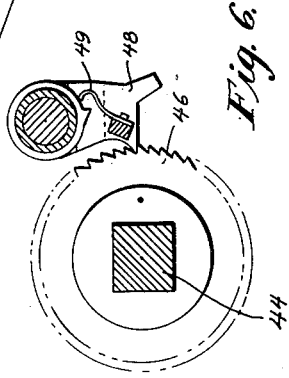
INVENTOR.
JOHN M. DALE
BY
ATTORNEY.

Oct. 2, 1962  J. M. DALE  3,056,613
QUICK-BREAK MARITIME COUPLING
Filed Feb. 18, 1960  3 Sheets-Sheet 3
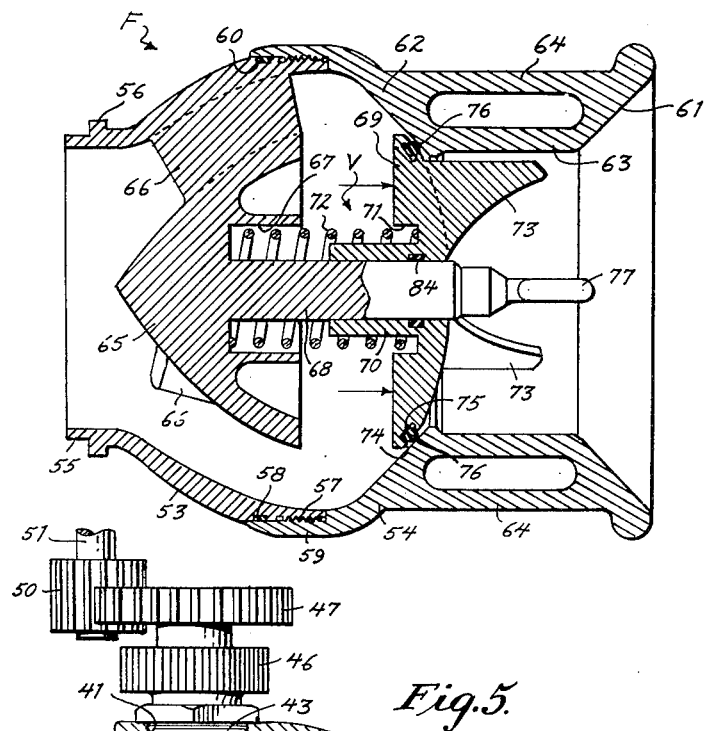
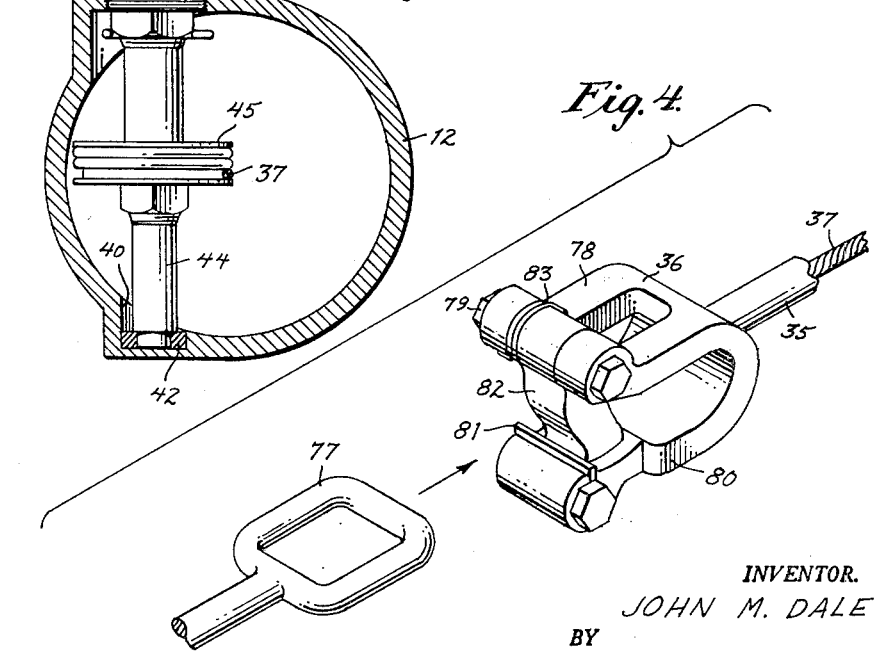
INVENTOR.
JOHN M. DALE
BY
ATTORNEY

United States Patent Office 3,056,613
Patented Oct. 2, 1962

3,056,613
QUICK-BREAK MARITIME COUPLING
John M. Dale, San Antonio, Tex., assignor to Dresser Industries, Inc., Dallas, Tex., a corporation of Delaware
Filed Feb. 18, 1960, Ser. No. 9,585
6 Claims. (Cl. 285—3)

The present invention deals with maritime couplings, and is concerned primarily with a coupling intended to be included in a fuel line and which coupling will accommodate the conditions of usage to which it is subjected.

At the present time, it is common practice to refuel naval ships, as well as those of the merchant marine, at sea from a fuel-supply ship. Also to convey oil from ships to wharf tanks and vice versa. In carrying out these operations, a flexible conduit which is quite massive must be connected to the ship being fueled as the connection to a dock tank. Heretofore, this practice has been attended by many disadvantages which are intended to be overcome by the coupling of this invention.

From the very nature of the operation involved, the fuel line is a flexible conduit that is quite heavy and massive; and considerable difficulty has been experienced in establishing the connection. Heretofore this connection has been achieved purely by the manual effort of seamen, dock workers or the like and without the benefit of any mechanical device operating under the principles of mechanical advantage.

Once the connection is established, the entire line from the supply ship to the tank being fueled is subject to the stresses and strains created by the movement of the ships in the water. Oftentimes these stresses and strains are so great as to cause the line to part. Not only does this result in the damage to the line itself, but in many instances a considerable amount of fuel is lost.

With the foregoing conditions in mind, the instant invention has in view as its foremost objective the provision of a quick-break maritime coupling of the character above indicated which is established or effected by mechanisms operating under the principles of mechanical advantage.

Another highly important object is to provide a coupling of the type indicated comprising male and female elements which are held in assembled relation by a frangible device, such as a shear pin, which will give when a predetermined load is exceeded. Thus, when the fuel line is subject to stresses and strains, the frangible device in the coupling is the weakest link in the entire line and will give, causing the coupling elements to part before the line will part at any other place.

Another important object of the invention is to provide, in a coupling of the type indicated, a coupling element that is carried at one end of the fueling line and which includes an automatically operable valve which will close the fuel line immediately upon parting of the coupling elements.

In carrying out the above-noted ideas in a practical embodiment, a coupling is provided which includes a male coupling element that is mounted at an appropriate point on the ship as connected to the tank that is to receive the fuel. Included in this male coupling element is a winch on which is taken up a line having a shackle on its free end. A female coupling element is carried by the fueling line at its free end, and houses the automatically operable valve aforesaid. Also included in the female coupling is an eye that is adapted to be engaged by the shackle so that, once the connection between the eye and the shackle is established, power may be applied to the winch to take up the line and cause the male and female elements to interfittingly engage one another. The valve in the female coupling is normally closed; but, once the engagement with the male coupling element is completely effected, this valve is opened to establish communication through the coupling.

An important object of the invention is to provide, in a coupling of the character aforesaid, a shackle having a spring-biased, pivotally mounted arm at its open end which is adapted to be automatically engaged by the eye in the female element by merely bringing the two together, and which arm is held in locked eye-engaging position by a shear pin. This pin is subject to being sheared upon the creation of a predetermined stress, thus permitting the coupling elements to separate. This arrangement is desirable, not only from the viewpoint of protecting the line from parting at any other place, but also affords a means for quickly disengaging the coupling by simply applying a required amount of stress to the line carrying the shackle through the winch.

A maritime coupling made in accordance with the above-noted objectives presents the advantages of being easily established by use of the winch, which operates under the principles of mechanical advantage, includes a safety factor in that the coupling elements will separate when the line is subject to a predetermined stress, and the end of the fuel line is automatically closed by the valve therein upon separation of the coupling elements, thereby preventing loss of fuel.

Various other more detailed objects and advantages of the invention, such as arise in connection with carrying out the above-noted ideas in a practical embodiment, will in part become apparent and in part be hereinafter stated as the description of the invention proceeds.

The invention therefore comprises a quick-break maritime coupling consisting essentially of complemental male and female elements one of which is adapted to be mounted on the end of a fuel line and the other on a ship or tank to be fueled. The latter coupling element includes a winch on which is taken up a line having a shackle, with a coupling element on the end of the fuel line including an automatically operable valve and an eye that is engaged by a shackle on the winch line, with a shear pin maintaining the assembled relation.

For a full and more complete understanding of the invention, reference may be had to the following description and accompanying drawings, wherein:

FIGURE 1 is a plan view developing the elements of the coupling of this invention in exploded relation;

FIGURE 3 is a longitudinal section through the female coupling element per se, depicting the valve therein in closed position;

FIGURE 4 is a detailed perspective taken on an enlarged scale, showing the eye and shackle in exploded relation;

FIGURE 5 is a section through the male coupling element where the winch is located, being taken about on the plane represented by the line 5—5 of FIGURE 2; and FIGURE 6 is a detail taken on the line 6—6 of FIGURE 2, illustrating the ratchet which is associated with the winch.

Figure 2:
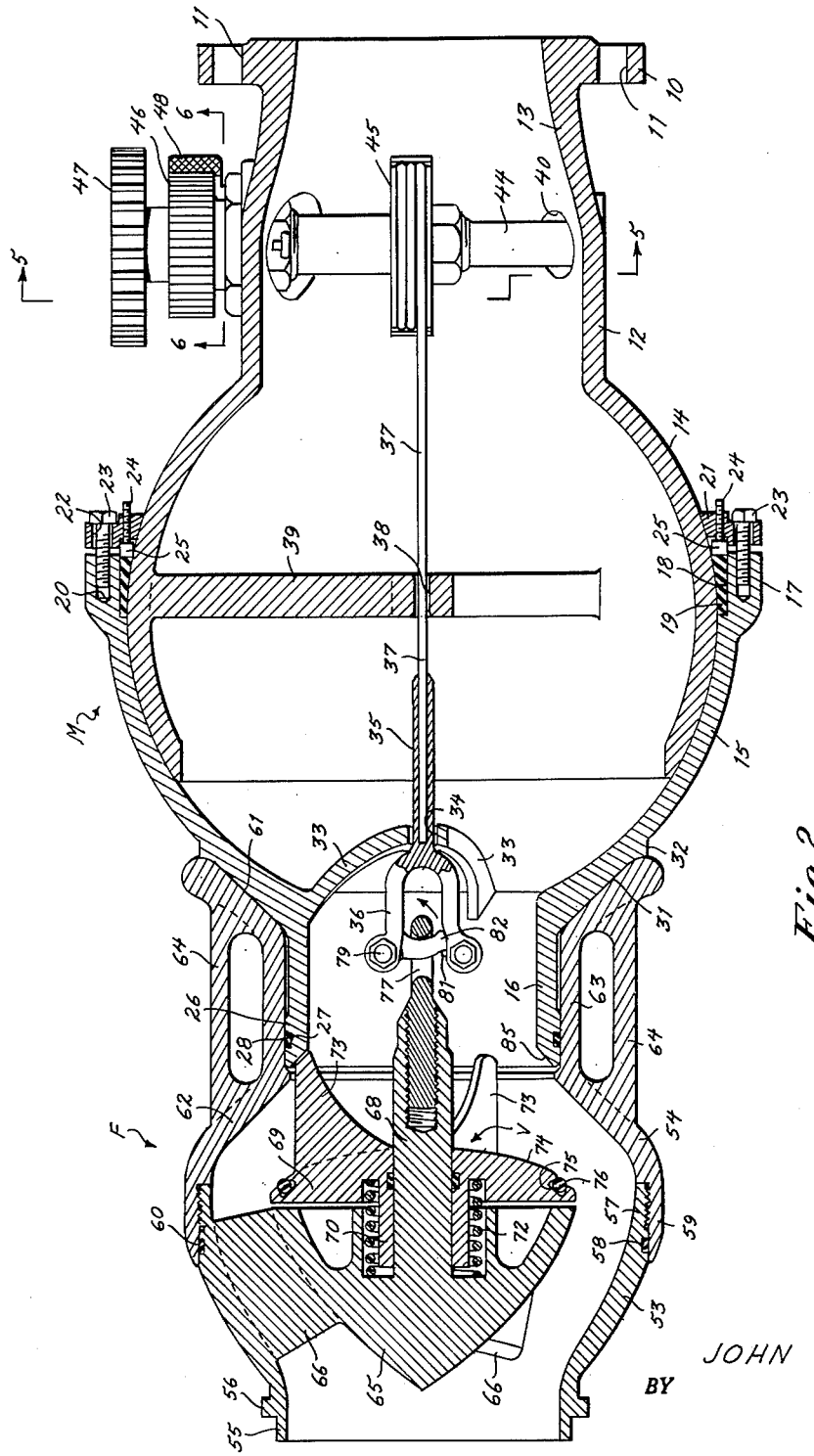
FIGURE 2 is a longitudinal section through the coupling as assembled, and is taken about on the plane represented by the line 2—2 of FIGURE 1.

Referring now to the drawings, wherein like reference characters denote corresponding parts, and first more particularly to FIGURE 1, the coupling of this invention is shown as comprising a male coupling element that is referred to in its entirety by the reference character M, a female coupling element F, and a cover C that is applied over the open end of the male coupling element M during those periods when the coupling is not in use.

While it would of course be entirely practical to reverse the arrangement herein illustrated in which the male coupling element M is carried by the ship to be fueled, and the female coupling element F by the fueling line, the invention is presently identified as having the male coupling element M including a flange 10 formed with boltholes 11 which are used in anchoring this coupling member on the ship to be fueled and in communication with a conduit (not illustrated) which extends to the fuel tanks. The flange 10 could just as well be used in eatablishing a connection to a tank on a wharf or dock or even be included as a part of a submarine connection.

Connected to the outer side of the flange 10 is a neck 12 that is generally cylindrical but which is restricted at the joinder to the flange 10 as indicated by the conical portion at 13. Integrally joined to the outer end of the neck 12 is a portion 14 that constitutes a segment of a sphere. The outer portion of this spherical portion 14 is snugly received within a complemental semispherical portion 15 which terminates in an outwardly extending nipple 16.

In order to establish a fluid-tight connection between the spherical segments 14 and 15, the latter is formed with an annular ring 17 that is spaced from the outer surface of the segment 14 to define an annular space 18 which receives a packing or gasket 19. The open-ended face of the ring 17 is formed with a plurality of threaded socket 20. A follower ring 21 is fitted over the segment 14 is formed with a plurality of apertures 22 in alignment with the threaded sockets 20. Headed bolts 23 pass through the apertures 22 and are screwed into the sockets 20. The follower ring 21 carries a plurality of spaced threaded stems 24 the inner ends of which carry heads 25 that engage the packing 19. It is evident that by tightening the bolts 23 and properly adjusting the stems 24 pressure may be applied to the packing 19 to achieve a fluid-tight seal in a well-known manner.

Adjacent to its outer end the nipple 16 is enlarged to provide an annular cylindrical surface 26 which is provided with an annular groove 27. Received in this groove 27 is a gasket 28 which cooperates either with the cover C or the female element F, in a manner to be later described.

It will be noted that during those periods when the coupling is not to be used, it is desirable that the outer end of the nipple 16 be closed. This is achieved by using the cover shown at C and which consists of a cup-shaped member having an annular skirt 29 formed with an inwardly opening groove 30 which receives the gasket 28.

Just backward of the neck 16, the spherical segment 15 is provided with a conical surface 31 terminating in a shoulder 32 which constitutes a seat for the mouth of the female coupling in a manner to be later described. Extending inwardly into the spherical segment 15 and connected thereto where the neck 16 joins therewith are three arms 33 which meet centrally, with the point of joinder being formed with a guide opening 34. Received in this guide opening 34 is a shank 35 carried by a shackle 36, to be later described in detail. Anchored in the shank 35 in a well-known manner is a winch line 37 which passes a guide opening 38 which is formed in a spider 39 that is integral with and carried by the spherical segment 14.

Referring now for the moment more particularly to FIGURE 5, it will be noted that the neck 12 is formed with a recess 40 and an oppositely disposed opening 41. Received in the recess 40 is a bearing member 42, while another bearing member 43 is received in the opening 41. A winch shaft 44 has one end received in the bearing 42, while the other end passes through the bearing 43. Drivably mounted on the shaft 44 in a winch drum 45 on which is taken up the line 37.

Outwardly of the neck 12, the shaft 44 carries a ratchet 46, and beyond that, a gear 47.

As shown in FIGURES 2 and 6, a pawl 48 cooperates with the teeth of the ratchet 46 and is biased into engagement therewith by a spring 49.

As shown in FIGURE 5, a pinion 50 meshes with the gear 47 and is carried by the power shaft 51. This power shaft and pinion are provided for the event in which it might be desirable to break the coupling by power applied to the winch shaft 44. The outer end of the shaft 44 is provided with wrench-engaging means, such as represented by the socket at 52 (see FIGURE 1) so that a manually operable wrench or handcrank may be applied to the shaft so as to take up the winch line 37 in drawing the coupling elements together.

Referring now more particularly to FIGURE 3, the female coupling element is shown as comprising two main parts 53 and 54. The part 53 has a nipple 55 and a flange 56 which are used in mounting the same at the end of a fuel line. The part 53 terminates in a cylindrical threaded portion 57, and immediately adjacent thereto is an annular groove 58. The part 54 has a skirt 59 that is interiorly threaded so that it may be screwed onto the threaded cylindrical neck 57. A packing member 60 is received in the groove 58, and a portion of the skirt 59 extends thereover.

The part 59 comprises a conical mouth 61 which is adapted to be seated on the surface 31 of the male member, and a valve-seat portion 62, with the two being connected by a cylindrical neck 63. Handgrips 64 are also shown as extending between the mouth 61 and the valve seat 62. The neck 63 is designed to snugly receive the cylindrical portion 26 of the nipple 16 on the male member, with the gasket 28 being compressed between the two. Thus a fluid-tight seal between the two coupling elements M and F is provided.

A valve assembly is referred to in its entirety by the reference character V. The valve assembly V includes a base member 65 that is carried by and within the female coupling part 53 by a plurality of webs 66. This base member 65 is formed with an annular recess 67 from which extends a guide shank 68. A valve member 69 carries a cylindrical guide 70 which slidably receives the shank 68. About this cylindrical guide 70 there is an annular recess 71. An expansion coil spring 72 has one end received in the recess 71 and the other end in the recess 67. The normal tendency of the spring 72 is to urge the valve member 69 outwardly away from the base 65. The valve member 69 carries a plurality of guide fins 73 that are received in the neck 63. The valve member 69 also has a surface at 74 which is complemental to the inner surface of the valve seat 62, and formed therein is an annular groove or recess 75 which carries a packing member 76. It is evident that, when this packing member 76 is forced against the valve seat 62 under the influence of the spring 72, communication to the mouth 61 is interrupted and the end of the fuel line is closed.

Secured to the free end of the shank 68 is an eye 77. This eye 77 cooperates with the shackle 36 in a manner now to be described.

The shackle 36 includes a bifurcated side wall 78 in which is mounted a shaft 79. The shackle 36 includes an opposite side wall 80 in the free end of which is movably mounted a shear pin 81. An arm 82 has one end formed with a bore (not illustrated) which receives the shaft 79, and this arm is spring-biased into an outer or shackle-closing position by a coil spring 83. The end of the arm 82 remote from the shaft 79 engages the shear pin 81 and is held thereagainst by the spring 83.

It is evident that eye 77 may be moved toward the shackle 36 so that it will engage the arm 82 and move the latter inwardly against the influence of the spring 83 with a swinging movement about the shaft 79 until the free end of the arm 82 clears the eye 77 and becomes engaged therewith. At this point the spring 83 will cause the arm 82 to return to shackle-closing position, with the eye 77 engaged thereon.

It is notable that the sliding engagement between the guide shank 68 and the cylindrical guide member 70 is sealed by the packing member shown at 84, and the free end of the nipple 16 is formed as a conical surface 85 which is adapted to engage the correspondingly shaped ends of the fins 73.

*Operation*

While the mode of operation and manner of using the coupling of this invention is believed to be obvious from the illustrations of the drawings and description of parts given, they may be briefly outlined as follows:

It will be assumed that the male coupling member M is permanently installed on the ship to be fueled, dock or similar place, and is closed by the cover C. Moreover, the female coupling F will be mounted on the free end of the flexible conduit constituting the fuel line that is carried by the fuel-supply ship.

When the connection between the two ships or ship and tank is to be effected, the cover C is first removed, and the shackle pulled outwardly, such action being permitted by simply releasing the pawl 48 from the ratchet 46. The line is pulled out sufficiently to afford ample working length. The connection between the eye 77 and the shackle 36 is now established by simply forcing the end of the eye 77 against the spring-biased arm 82. During this initial manipulation, the handgrips 64 may be availed of by the seamen. Once the connection between the eye 77 and shackle 36 is established, power is applied to the winch shaft 44. This ordinarily will be accomplished by simply using a wrench or hand crank, which is applied to the wrench-engaging means 52. Manual force that is amplified by the mechanical advantage afforded by the winch will ordinarily be sufficient to draw the two coupling members together. Thus, as the line 37 is taken up on the winch drum 45, the female coupling F will be drawn towards the male coupling member M, with the nipple 16 of the latter first passing through the mouth 61 and then into the neck 63. As this action takes place, the conical end 85 of the nipple engages the ends of the fins 73 so as to move the valve member 69 inwardly against the influence of the spring 72. This unseats the valve member 69 from the valve 62 and establishes communication through the coupling.

Should at any time during the fueling operation excessive stresses be created on the fuel line, the shear pin 81 will give, once a predetermined pressure is exceeded, and the coupling elements F and M will separate. However, as this action takes place, the spring 72 will immediately move the valve member 69 into seating position closing the female coupling element. Thus, no fuel will be lost.

Under ordinary conditions, the coupling may be broken by simply releasing the pawl 48 from the ratchet 46; whereupon the coupling members may be pulled apart by simply paying out the line 37, after which the eye 77 is disengaged from the shackle 36. However, should it be found desirable to more quickly break the coupling, power could be applied to the winch shaft 44 through the medium of power shaft 51, pinion 50, and gear 47 to shear the pin 81. The shear pin 81 obviously is replaceable.

While a preferred specific embodiment of the invention is hereinbefore set forth, it is to be clearly understood that the invention is not to be limited to the exact constructions, mechanisms, and devices illustrated and described, because various modifications of these details may be provided in putting the invention into practice within the purview of the appended claims.

What is claimed is:

1. In a maritime coupling, complemental male and female coupling elements, means on one of said coupling elements for securing that element in connective relation with a tank to be fueled, means on the other coupling element for securing that element to the end of a fuel line, a winch shaft rotatably mounted in one of said elements, a winch drum on said shaft, a winch line taken up on said drum, a connecting member at the end of said line, a complemental connecting element on the other of said coupling members adapted to be connected to the connecting member on said winch line, means for applying power to said shaft to take up said line and draw said coupling elements together when said connecting members are connected, and frangible means carried by one of said connecting members maintaining said coupling members in assembled relation.

2. In a maritime coupling, complemental male and female coupling elements, means on one of said coupling elements for securing that element in connective relation with a tank to be fueled, means on the other coupling element for securing that element to the end of a fuel line, a winch shaft rotatably mounted in one of said elements, a winch drum on said shaft, a winch line taken up on said drum, a shackle on the free end of said winch line including a swinging arm together with frangible means for limiting outward movement of said arm relative to said shackle, an eye on the other of said coupling elements adapted to be connectively engaged to said shackle, means for applying power to said winch shaft to rotate the same, and a ratchet-and-pawl assembly operatively associated with said winch shaft for holding said coupling elements in assembled relation.

3. In a maritime coupling, mechanism for drawing complemental coupling elements together comprising a shackle mounted on one end of a winch line that is operatively mounted within one coupling element and an eye carried by the other of said coupling elements, said shackle including spaced side walls, an arm pivotally mounted at the end of one side wall and spanning the distance between said side walls, spring means normally rotating said arm outwardly, and a shear pin carried at the end of said other side wall limiting outward movement of said arm, said eye being adapted to engage said arm to force the latter inwardly against the influence of said spring to permit said arm to become engaged with said eye.

4. In a maritime coupling, mechanism for drawing complemental coupling elements together comprising a shackle mounted on one end of a winch line that is operatively mounted within one coupling element and an eye carried by the other of said coupling elements, said shackle being of U-shaped formation defined by spaced side walls and a bend, one of said side walls being bifurcated, a shaft at the end of said bifurcated side wall, an arm rotatably mounted on said shaft, a coil spring associated with said shackle and arm normally rotating said arm outwardly, a replaceable shear pin on the end of said other side wall limiting outward movement of said arm, and a straight front bar included as a part of said eye and engageable with said arm to depress the latter against the influence of said spring and permit said arm to become engaged with said eye.

5. In a maritime coupling, a pair of complemental coupling elements, a device operating under the principles of mechanical advantage for drawing said complemental coupling elements together, said device comprising a winch shaft mounted transversely in one coupling element, a ratchet-and-pawl mechanism operatively associated with said winch shaft, a winch drum on said shaft, a winch line extending from said drum, a shackle at the free end of said winch line and an eye affixed to the other coupling elements and adapted to be connected to said shackle.

6. In a maritime coupling, a pair of complemental coupling elements, a device operating under the principles of mechanical advantage for drawing said complemental coupling elements together, said device comprising a winch shaft mounted transversely in one coupling element, a ratchet-and-pawl mechanism operatively associated with said winch shaft, a winch drum on said shaft, a winch line extending from said drum, a shackle at the free end of said winch line, an eye affixed to the other coupling elements and adapted to be connected to said shackle and spaced guide means carried by the coupling element in which said winch shaft is mounted and through which said winch line passes.

References Cited in the file of this patent

UNITED STATES PATENTS

| | | |
|---|---|---|
| 1,057,939 | Cooper | Apr. 1, 1913 |
| 1,821,771 | Plummer | Sept. 1, 1931 |
| 2,428,381 | Parry | Oct. 7, 1947 |
| 2,457,251 | Main | Dec. 28, 1948 |
| 2,770,474 | Krapp | Nov. 13, 1956 |
| 2,815,226 | Rowland et al. | Dec. 3, 1957 |
| 2,901,008 | Cavett et al. | Aug. 25, 1959 |
| 2,927,771 | Clark | Mar. 8, 1960 |